United States Patent
Kim

(10) Patent No.: US 12,125,232 B2
(45) Date of Patent: Oct. 22, 2024

(54) METHOD AND APPARATUS FOR CALCULATING POSITION OF DART PIN

(71) Applicant: ELECTRONICS AND TELECOMMUNICATIONS RESEARCH INSTITUTE, Daejeon (KR)

(72) Inventor: Do Hyung Kim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 158 days.

(21) Appl. No.: 17/693,964

(22) Filed: Mar. 14, 2022

(65) Prior Publication Data
US 2022/0292709 A1    Sep. 15, 2022

(30) Foreign Application Priority Data

Mar. 15, 2021 (KR) .................. 10-2021-0033200
May 17, 2021 (KR) .................. 10-2021-0063149

(51) Int. Cl.
| F41J 5/04 | (2006.01) |
| A63F 9/02 | (2006.01) |
| F41J 3/02 | (2006.01) |
| F41J 5/02 | (2006.01) |
| F41J 5/08 | (2006.01) |
| G06T 7/70 | (2017.01) |
| H04N 23/71 | (2023.01) |

(52) U.S. Cl.
CPC .............. *G06T 7/70* (2017.01); *A63F 9/0208* (2013.01); *F41J 3/02* (2013.01); *F41J 5/02* (2013.01); *F41J 5/08* (2013.01); *H04N 23/71* (2023.01)

(58) Field of Classification Search
None
See application file for complete search history.

(56) References Cited

U.S. PATENT DOCUMENTS

| 4,164,081 A * | 8/1979 | Berke ........................ F41J 5/02 434/22 |
| 10,317,177 B2 | 6/2019 | Dale et al. |
| 10,962,336 B2 * | 3/2021 | Hollinger ............ A63F 11/0051 |
| 2003/0134700 A1 * | 7/2003 | Salva ....................... F41J 13/02 473/476 |
| 2006/0061039 A1 * | 3/2006 | Pan ............................ F41J 5/02 273/371 |

(Continued)

FOREIGN PATENT DOCUMENTS

| JP | 2019-97779 | 6/2019 |
| KR | 10-1757663 | 7/2017 |

(Continued)

*Primary Examiner* — Sunit Pandya
(74) *Attorney, Agent, or Firm* — KILE PARK REED & HOUTTEMAN PLLC

(57) ABSTRACT

A method for calculating a position of a dart pin attached to a dart board divided into a plurality of segments in an apparatus for calculating a position of a dart pin is provided. The method includes obtaining a plurality of optical data from a plurality of optical devices corresponding to at least one of a plurality of holes formed in each segment and installed on the rear surface of the dart board; and calculating a position of a dart pin attached to the dart board using the plurality of optical data.

18 Claims, 7 Drawing Sheets

(56) References Cited

U.S. PATENT DOCUMENTS

| | | | |
|---|---|---|---|
| 2011/0031696 A1* | 2/2011 | Su | F41J 5/02 273/371 |
| 2014/0375562 A1* | 12/2014 | Pereira | G06F 3/0425 345/158 |
| 2017/0257568 A1 | 9/2017 | Kim et al. | |
| 2019/0113313 A1 | 4/2019 | Hong | |
| 2019/0320519 A1 | 10/2019 | Kim et al. | |

FOREIGN PATENT DOCUMENTS

| | | |
|---|---|---|
| KR | 10-1912754 | 10/2018 |
| KR | 10-1963773 | 3/2019 |

\* cited by examiner

METHOD AND APPARATUS FOR CALCULATING POSITION OF DART PIN

CROSS-REFERENCE TO RELATED APPLICATION

This application claims priority to and the benefit of Korean Patent Application Nos. 10-2021-0033200 and 10-2021-0063149 filed in the Korean Intellectual Property Office on Mar. 15, 2021, and May 17, 2021, the entire contents of which are incorporated herein by reference.

BACKGROUND OF THE INVENTION

(a) Field of the Invention

The present invention relates to a method and apparatus for calculating a position of a dart pin, and more particularly, to a method and apparatus for calculating a position of a dart pin capable of more accurately calculating the position of a dart pin attached to a dart board without user intervention.

(b) Description of the Related Art

Currently, a mechanical method and an image-based method are used to calculate the position of the dart pin attached to the dart board. In the mechanical method, pressure sensors are attached to the area of the dart board or the area where the tip of the dart pin is inserted, and the position of the tip is calculated based on the pressure sensors. In the image-based method, one or more cameras are attached around the dart board or on a dart machine, and the position of the tip is calculated based on the images acquired from the camera.

The image-based method has the following problems. The lighting conditions in the environment in which the dart board and dart machine are placed cannot be known in advance and may vary greatly. In addition, there is no standard for the color of the area on the dart board, and there is no standard for the color of the dart pin and the tip, so prior information is insufficient. Furthermore, the relative position between the camera and the dart board may change due to an impact in the process of attaching and detaching the dart pin to and from the dart board, and as the plurality of dart pins are attached to the dart board, occlusion between the dart pins may occur, and it may be difficult to determine the position of the dart pins attached later.

SUMMARY OF THE INVENTION

The disclosure has been made in an effort to provide a method and apparatus for calculating a position of a dart pin capable of robustly calculating the position of the dart pin against external lighting, color change of the dart board and the dart pin, impact, and occlusion between the dart pins.

According to an exemplary embodiment, a method for calculating a position of a dart pin attached to a dart board divided into a plurality of segments in an apparatus for calculating a position of a dart pin is provided. The method for calculating a position of a dart pin includes: obtaining a plurality of optical data from a plurality of optical devices corresponding to at least one of a plurality of holes formed in each segment and installed on the rear surface of the dart board; and calculating a position of a dart pin attached to the dart board using the plurality of optical data.

The optical data may include image data or optical data.

The calculating of a position of a dart pin may include: checking whether there is an image change between two images by comparing each of a plurality of images obtained from a plurality of cameras with the previous image obtained from a plurality of cameras, respectively; when the brightness of an area where the image change occurs is darkened, determining that the dart pin is attached and calculating the position of the area; and outputting a score corresponding to the position of the area.

The calculating of a position of a dart pin may further include determining that the dart pin is detached when the brightness of the area where the image change occurs becomes brighter.

A light emitting device may be attached to the end of the dart pin, and the calculating of a position of a dart pin may further include determining that the dart pin is attached when the brightness of the area where the image change occurs becomes brighter.

The calculating of the position of the area may include calculating a position set corresponding to a camera that has photographed an image including the area as the position of the area.

The calculating of a position of a dart pin may include: checking whether there is a brightness change by comparing each optical signal obtained from each optical sensor corresponding to each hole with the previous optical signal obtained from each optical sensor; if the brightness is changed from bright to dark, determining that the dart pin is attached, and calculating a position of the hole changed from bright to dark; and outputting a score corresponding to the position of the hole.

The calculating of a position of a dart pin may further include determining that the dart pin is detached when the brightness is changed from dark to bright.

A light emitting device may be attached to the end of the dart pin, and the calculating of a position of a dart pin may further include determining that the dart pin is attached when the brightness is changed from dark to bright.

The dart board may be fixed to a backboard, and the plurality of optical devices may be installed to face the rear surface of the dart board in a space between a rear surface of the dart board and the backboard.

According to another embodiment, an apparatus calculating a position of a dart pin attached to a dart board divided into a plurality of segments is provided. The apparatus calculating a position of a dart pin includes: a plurality of optical devices that correspond to at least one of a plurality of holes formed in each segment and installed to face the rear surface of each segment in a space between the dart board and a backboard to which the dart board is fixed; and a position calculator that calculates a position to which the dart pin is attached to the dart board using a plurality of optical data generated from the plurality of optical devices, respectively.

The optical device may include a camera.

The position calculator may compare each image obtained from the plurality of optical devices with a previous image obtained from the plurality of optical devices, may detect the area to which the dart pin is attached from the change in brightness between the two images, and may calculate the position of the area.

The position calculator may determine that the dart pin is attached when the brightness between the two images is changed from bright to dark.

A light emitting device may be attached to the end of the dart pin, and the position calculator may determine that the dart pin is attached when the brightness between the two images is changed from dark to bright.

The optical device may include an optical sensor, and each optical sensor may be installed in a one-to-one correspondence with each hole.

The position calculator may compare each optical signal detected from the plurality of optical devices with the previous optical signal detected from the plurality of optical devices, may detect the area to which the dart pin is attached from the change in brightness between the two optical signals, and may calculate the position of the area.

The position calculator may determine that the dart pin is attached when the brightness of the two optical signals is changed from bright to dark.

A light emitting device may be attached to the end of the dart pin, and the position calculator may determine that the dart pin is attached when the brightness of the two optical signals is changed from dark to bright.

DETAILED DESCRIPTION OF THE EMBODIMENTS

Figure 1:
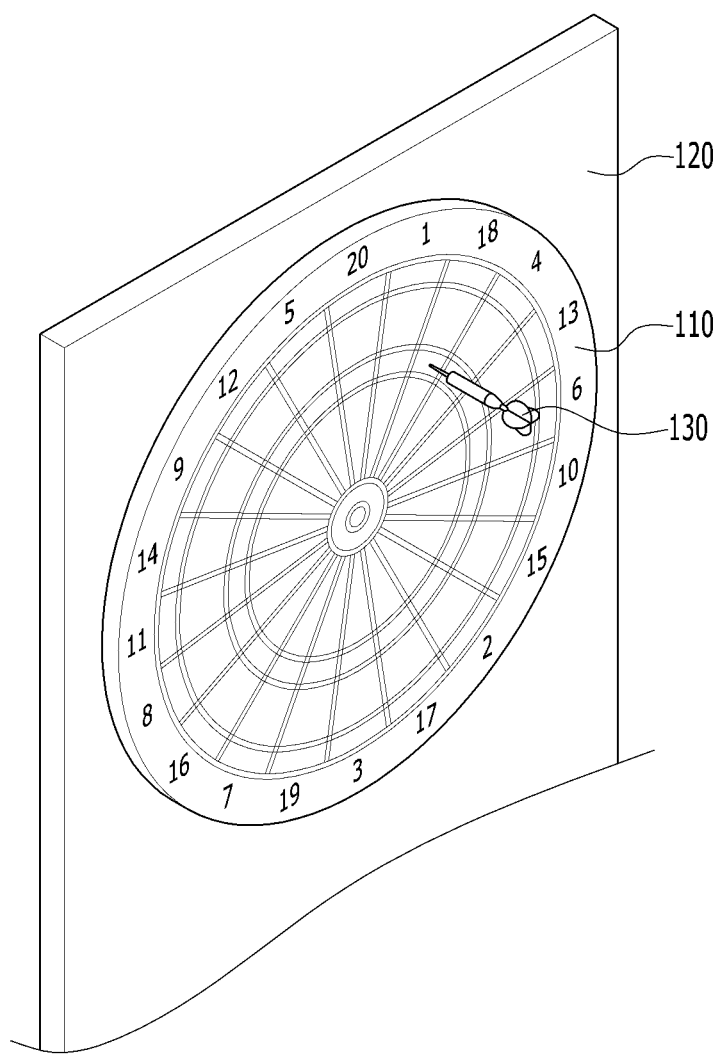
FIG. 1 is a diagram illustrating a dart device according to an embodiment.

Hereinafter, embodiments of the disclosure will be described in detail with reference to the attached drawings so that a person of ordinary skill in the art may easily implement the disclosure. As those skilled in the art would realize, the described embodiments may be modified in various different ways, all without departing from the spirit or scope of the disclosure. Accordingly, the drawings and description are to be regarded as illustrative in nature and not restrictive. Like reference numerals designate like elements throughout the specification.

Throughout the specification and claims, when a part is referred to "include" a certain element, it means that it may further include other elements rather than exclude other elements, unless specifically indicated otherwise.

Now, a method and apparatus for calculating a position of a dart pin according to an embodiment of the present invention will be described in detail with reference to the drawings.

FIG. 1 is a diagram illustrating a dart device according to an embodiment.

Referring to FIG. 1, the dart device includes a soft dart board 110, a backboard 120, and a soft dart pin 130.

The soft dart board 110 is fixed to the backboard 120. At least one sheet layer may be positioned between the soft dart board 110 and the backboard 120.

The soft dart board 110 has a bullseye located in the center, and is divided into a plurality of segments 112 by concentric circles centered on the bullseye and straight lines radially extending from the bullseye. In each segment 112, a score corresponding to the position of each segment is set.

Figure 2:
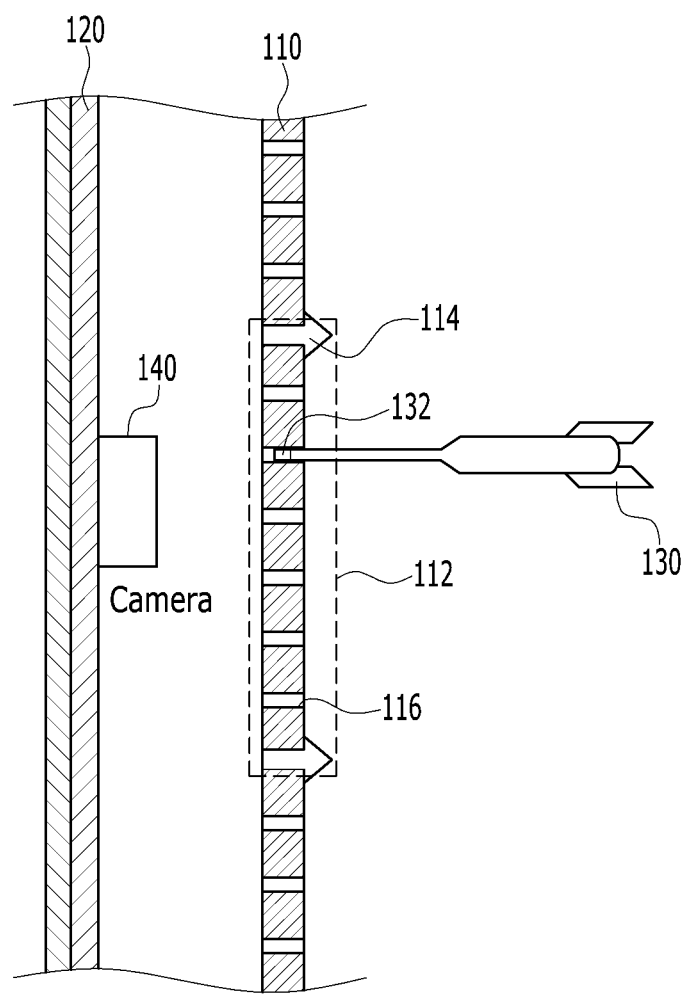
FIGS. 2 and 3 are illustrating the segment shown in FIG. 1, respectively.
Figure 3:
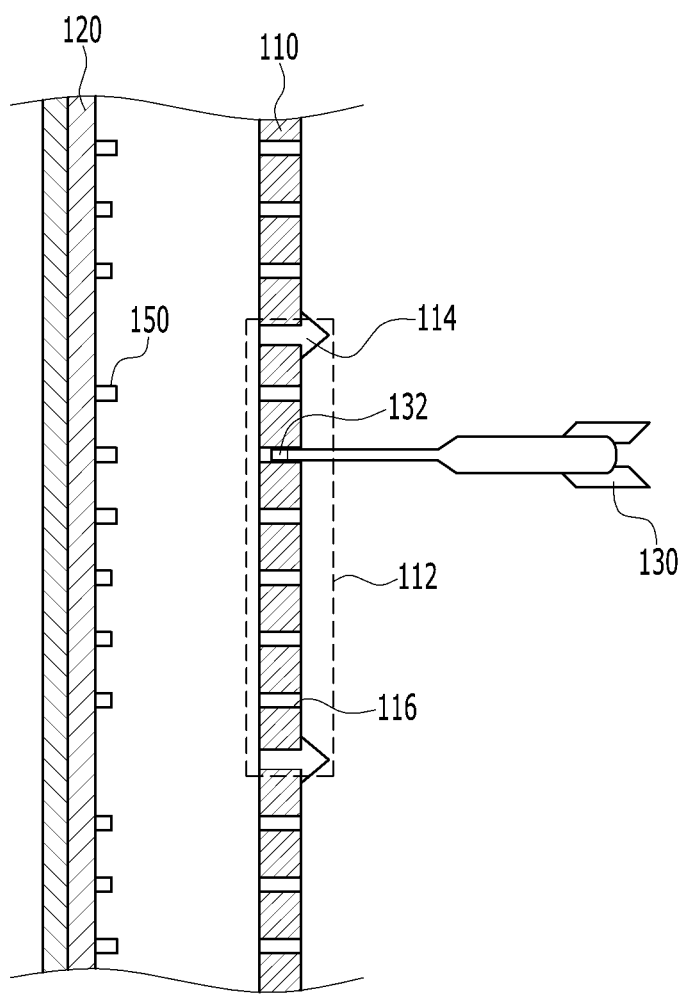

FIGS. 2 and 3 are figures illustrating the segment shown in FIG. 1, respectively.

As shown in FIG. 2, the dart board 110 is fixed to the backboard 120. At this time, a predetermined space is formed between the plurality of segments 112 of the dart board 110 and the backboard 120.

Holes 114 called bits are densely formed in each segment 112, and a dart tip 132 of the soft dart pin 130 thrown from the front is inserted into a hole 114 formed in the segment 112.

In addition, the segments 112 are separated by a dividing element 116, and a score corresponding to the position of each segment 112 is set. Thus, a score is calculated according to the position of the segment 112 that the dart tip 132 of the soft dart pin 130 penetrates.

In one embodiment, a plurality of cameras 140 are used for score calculation. The cameras 140 are positioned in the predetermined space formed between the segments 112 of the dart board 110 and the backboard 120, and may be fixed on the backboard 120. Alternatively, the camera 140 may be mounted on a structure fixed to the rear surface of the dart board 110 to face the rear surface of the dart board 110.

Each camera 140 may correspond to at least one hole 114 formed in the segments 112 of the dart board 110. For example, one segment 112 may be divided into a plurality of areas, and a camera 140 may be positioned in each area. Alternatively, one camera 140 may be positioned corresponding to two or more segments 112. In FIG. 2, only one camera 140 is illustrated for convenience of description, and one camera 140 is illustrated as corresponding to the holes 114 of one segment 112.

The camera 140 photographs a rear surface of the segment 112, and the position of the segment 112 in which the dart tip 132 is inserted is detected using the photographed image.

Meanwhile, as shown in FIG. 3, a plurality of optical sensors 150 may be used instead of the plurality of cameras 140. As the optical sensor 150, for example, an infrared sensor, a brightness sensor, or an illuminance sensor may be used. The plurality of optical sensors 150 may be mounted on a structure fixed to the rear surface of the dart board 110.

The plurality of optical sensors 150 may be installed in a one-to-one correspondence with the holes 114 formed in the dart board 110. That is, the positions of the plurality of holes are set to correspond to the plurality of optical sensors 150, respectively. The position of the hole 114 in which the dart tip 132 is inserted may be calculated using the data sensed by the plurality of optical sensors 150, and the position of the segment 112 may be detected from the position of the hole 114.

Figure 4:
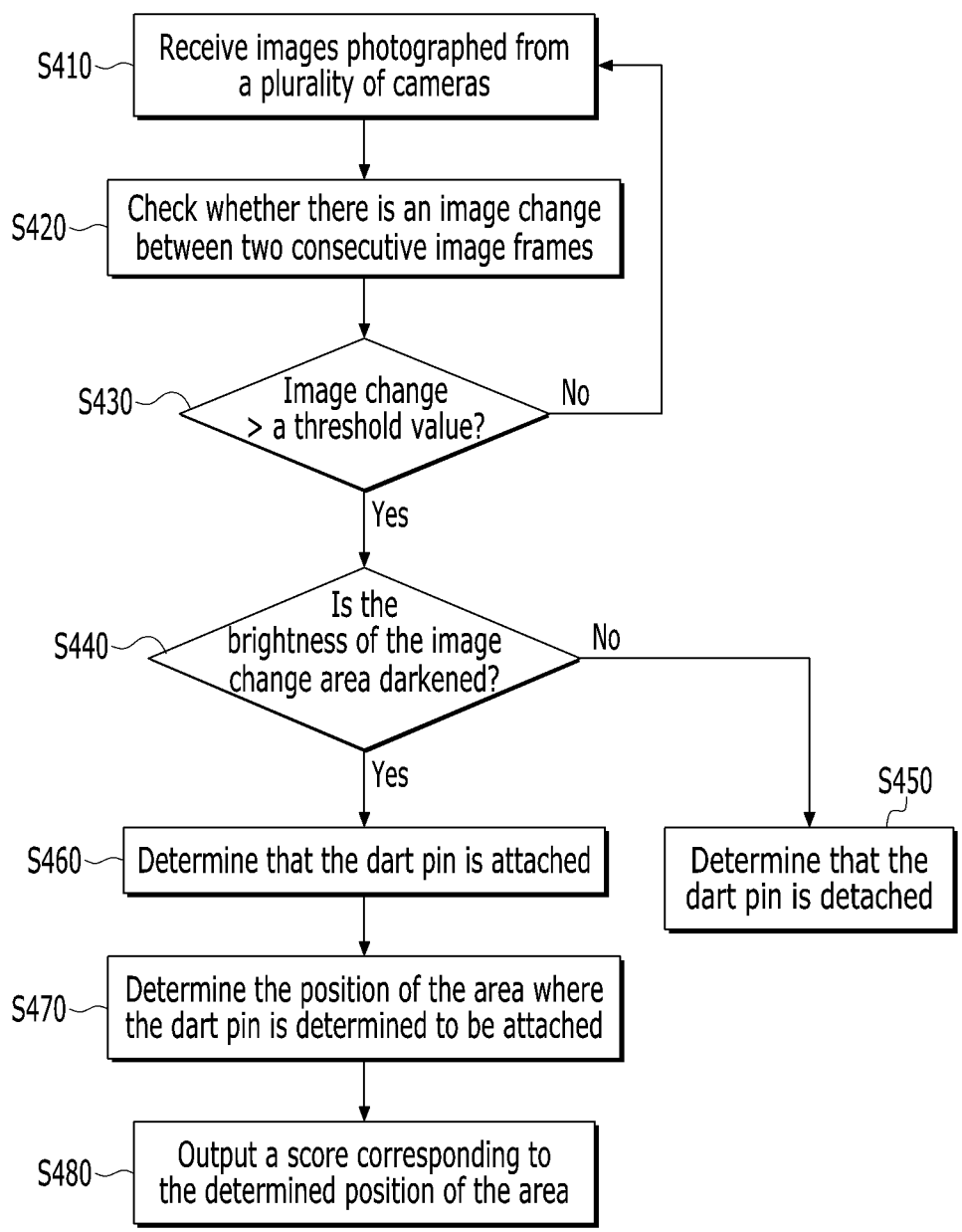
FIG. 4 is a flowchart illustrating a method for calculating a position of a dart pin using camera images according to an embodiment.

FIG. 4 is a flowchart illustrating a method for calculating a position of a dart pin using camera images according to an embodiment.

Referring to FIG. 4, the apparatus for calculating a position of a dart pin receives images photographed from a plurality of cameras (S410). As described above, the plurality of cameras respectively correspond to a plurality of areas formed in the dart board 110, and each area includes at least one hole. For example, each camera corresponds to each segment, and may photograph the segment area of the rear surface of each segment.

When the apparatus for calculating a position of a dart pin obtains images from a plurality of cameras, it compares two consecutive image frames for each camera and checks whether there is an image change between the two consecutive image frames (S420). For example, the apparatus for calculating a position of a dart pin compares the image frame at time t with an image frame at the immediately preceding time (t−1), and checks whether there is an image change between the image frame at time t and the image frame at time (t−1). The image change may indicate a change in brightness of the image.

The apparatus for calculating a position of a dart pin compares the image change with a threshold value (S430).

When the image change exceeds the threshold value, the apparatus for calculating a position of a dart pin determines that the dart pin is attached (S460) if the brightness of the area where the image change occurs is darkened (S440), and determines that the dart pin is detached (S450) if the brightness of the corresponding area becomes brighter (S440).

Next, the apparatus for calculating a position of a dart pin calculates the position of the area where the image change occurs. Since each camera corresponds to each set area, the apparatus for calculating a position of a dart pin determines the position of the area where the dart pin is determined to be attached (S470). The apparatus for calculating a position of a dart pin may determine the position of the area to which the dart pin is attached from the identifier of the camera that has photographed the image of the area to which the dart pin is attached.

The apparatus for calculating a position of a dart pin outputs a score corresponding to the determined position of the area (S480).

In addition, the apparatus for calculating a position of a dart pin may transmit information such as images photographed by a camera, images of areas where an image change occurs, information on whether the dart pin is attached or detached, the position of the dart pin on the dart board, and the number (ID) of the hole to which the dart pin is attached or detached, and the segment number (ID) to the hole to which the dart pin is attached or detached belongs, to a server (not shown in the drawing).

The server may store and manage information for each player using the information received from the apparatus for calculating a position of a dart, and may provide services such as providing a prize according to a score. In addition, the server may provide a dart game by connecting multiple players through a network.

Figure 5:
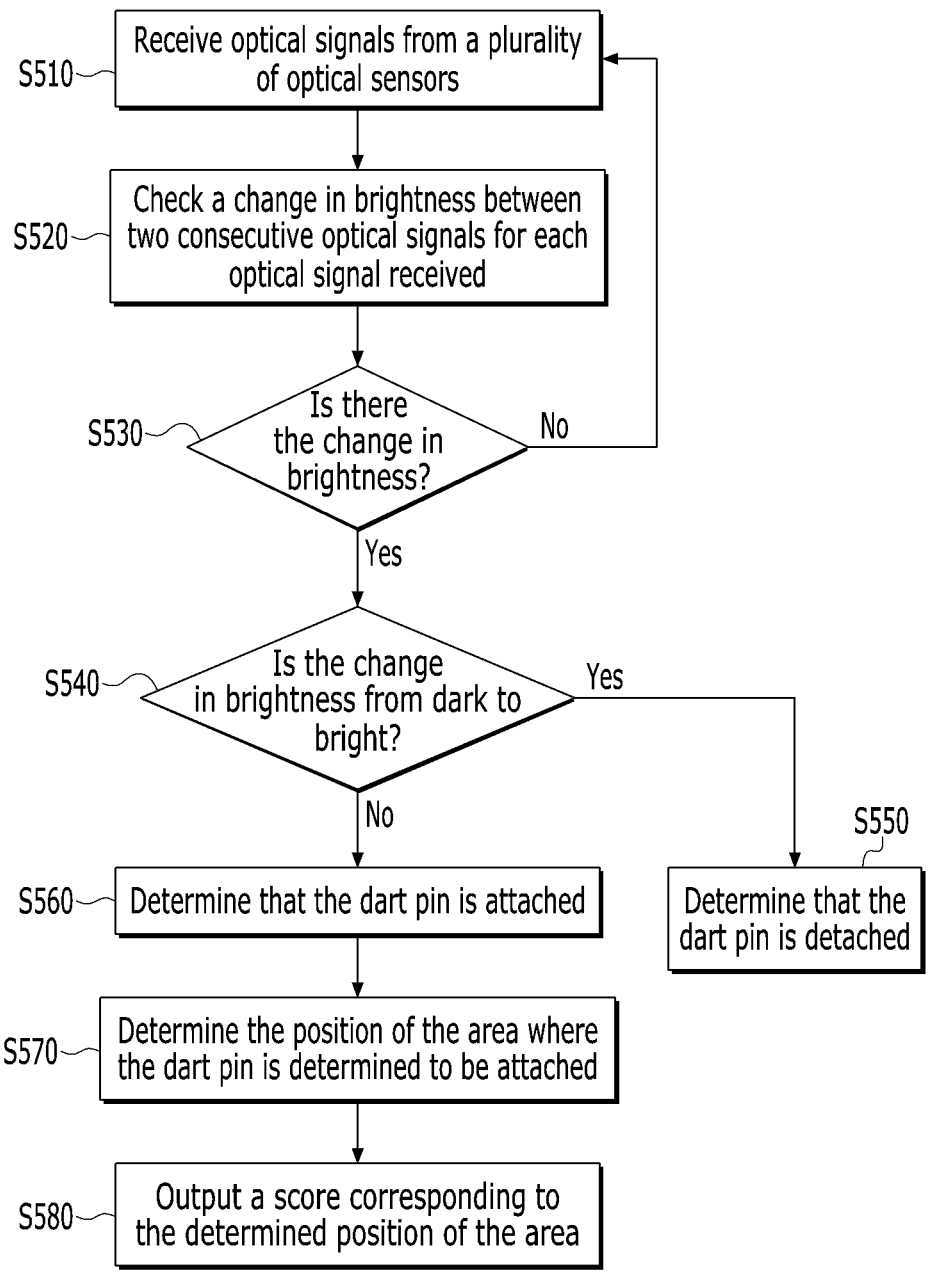
FIG. 5 is a flowchart illustrating a method for calculating a position of a dart pin using an optical sensor according to another embodiment.

FIG. 5 is a flowchart illustrating a method for calculating position of a dart pin using an optical sensor according to another embodiment.

Referring to FIG. 5, the apparatus for calculating a position of a dart pin receives optical signals from a plurality of optical sensors installed to correspond to the holes formed in the soft dart board, respectively (S510).

The apparatus for calculating a position of a dart pin compares the brightness of each optical signal received from the plurality of optical sensors with the optical signal received immediately before, and checks whether there is a change in brightness between two consecutive optical signals (S520). For example, when the apparatus for calculating a position of a dart pin receives optical signals from a plurality of optical sensors at time t, compares the brightness of the optical signal received from each optical sensor at time t and the brightness of optical signal received from each optical sensor at time (t−1), and checks whether there is a change in brightness between the optical signal at time t and the optical signal at time (t−1).

When there is a change in brightness between the optical signal at time t and the optical signal at time (t−1) (S530), the apparatus for calculating a position of a dart pin checks the type of brightness change for each optical sensor in which the brightness change occurs. The apparatus for calculating a position of a dart pin checks whether the change in brightness changes from dark to bright or from bright to dark.

If the brightness is changed from dark to bright (S540), the apparatus for calculating a position of a dart pin determines that the dart pin is detached (S550), and if the brightness is changed from light to dark (S540), determines that the dart pin is attached (S560).

The apparatus for calculating a position of a dart pin checks the position of the hole to which the dart pin is attached, that is, the hole in which the brightness change from dark to bright occurs, and determines the position of the segment to which the dart pin is attached from the position of the hole (S570). The position of the hole to which the dart pin is attached can be determined by the optical sensor in which the change in brightness from dark to bright occurs.

The apparatus for calculating a position of a dart pin outputs a score corresponding to the determined position of the segment (S580).

In addition, the apparatus for calculating a position of a dart pin may transmit information such as the number (ID) of the optical sensor where the brightness change occurred, the type of brightness change of the optical sensor, and the hole number and hole position of the dart board corresponding to the optical sensor where the brightness change occurred, to the server.

The server may store and manage information for each player using the information received from the apparatus for calculating a position of a dart, and may provide services such as providing a prize according to a score. In addition, the server may provide a dart game by connecting multiple players through a network.

On the other hand, a light emitting device may be attached to the end of the dart pin 130. When the light emitting device is attached to the end of the dart pin 130, the apparatus for calculating a position of a dart pin may determine that the dart pin is detached if the brightness is changed from light to dark, and may determine that the dart pin is attached if the brightness is changed from dark to bright.

For example, when the light emitting device is attached to the end of the dart pin 130, unlike S450 and S460 of FIG. 4, the apparatus for calculating a position of a dart pin determines that the dart pin is attached when the brightness of the area where the image change occurs becomes brighter, and determines that the dart pin is detached when the brightness of the corresponding area becomes darker.

Furthermore, when the light emitting device is attached to the end of the dart pin 130, unlike S550 and S560 of FIG. 5, the apparatus for calculating a position of a dart pin determines that the dart pin is attached if the brightness is changed from dark to bright, and determines that the dart pin is detached if the brightness is changed from light to dark.

Figure 6:
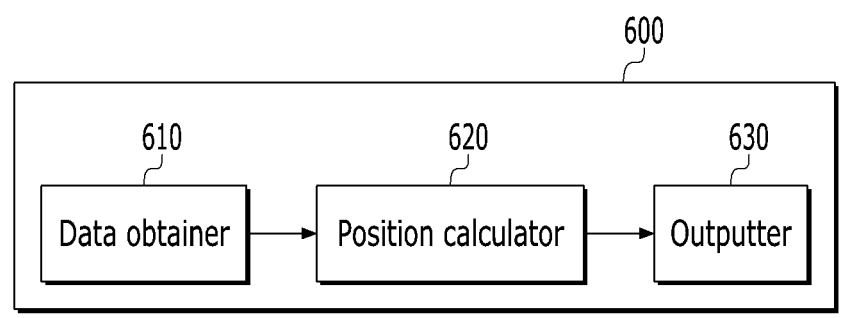
FIG. 6 is a diagram illustrating an apparatus for calculating a position of a dart pin according to an embodiment.

FIG. 6 is a diagram illustrating an apparatus for calculating a position of a dart pin according to an embodiment.

Referring to FIG. 6, the apparatus for calculating a position of a dart pin 600 includes a data obtainer 610, a position calculator 620, and an outputter 630.

The data obtainer 610 obtains a plurality of optical data from a plurality of cameras (140 in FIG. 2) or a plurality of optical sensors (150 in FIG. 2). The plurality of cameras (140 in FIG. 2) or the plurality of optical sensors (150 in FIG. 2) are installed to face the rear surface of the segment 112 in the space between the dart board 110 and the backboard 120. The optical data may be images photographed by a plurality of cameras (140 in FIG. 2) or optical signals obtained from a plurality of optical sensors (150 in FIG. 2). The data obtainer 610 may include a plurality of cameras (140 in FIG. 2) or a plurality of optical sensors (150 in FIG. 2).

The position calculator 620 determines the position of the segment to which the dart pin is attached in the same manner as described with reference to FIG. 3 by using the images photographed by the plurality of cameras (140 of FIG. 2). In addition, the position calculator 620 determines the position of the segment to which the dart pin is attached in the same manner as described in FIG. 4 using optical signals obtained from the plurality of optical sensors (150 of FIG. 2). The position calculator 620 may calculate a score from the position of the segment to which the dart pin is attached.

As described above, since the position of the segment to which the dart pin is attached is calculated using optical data obtained by an optical device installed to the rear surface of the dart board 110, that is, between the dart board 110 and the backboard 120, it may not be affected by external lighting, color change of the dart board and dart pins, impact, and occlusion between the dart pins in the position calculation.

The outputter 630 may output the position and/or score of the segment to which the dart pin is attached. The outputter 630 may transmit information such as images photographed by a camera, images of areas where an image change occurs, information on whether the dart pin is attached or detached, the position of the dart pin on the dart board, the number (ID) of the hole to which the dart pin is attached or detached, and the segment number (ID) of the hole to which the dart pin is attached or detached belongs, to a server. The outputter 630 may transmit information such as the number (ID) of the optical sensor where the brightness change occurred, the type of brightness change of the optical sensor, and the hole number and hole position of the dart board corresponding to the optical sensor where the brightness change occurred, to the server.

Figure 7:
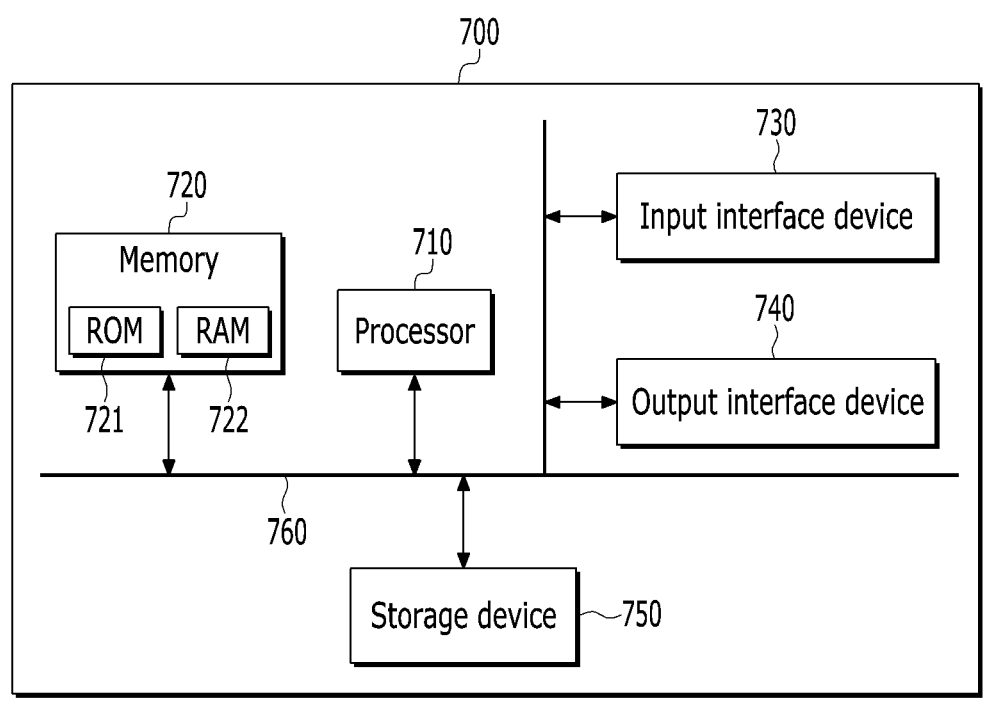
FIG. 7 is diagram illustrating an apparatus for calculating a position of a dart pin according to another embodiment.

FIG. 7 is diagram illustrating an apparatus for calculating a position of a dart pin according to another embodiment.

Referring to FIG. 7, an apparatus for calculating a position of a dart pin 700 may represent a computing device in which the above-described method for calculating a position of a dart pin is implemented.

The apparatus for calculating a position of a dart pin 700 may include at least one of a processor 710, a memory 720, an input interface device 730, an output interface device 740, and a storage device 750. Each of the components may be connected by a common bus 760 to communicate with each other. In addition, each of the components may be connected through an individual interface or an individual bus centered on the processor 710 instead of the common bus 760.

The processor 710 may be implemented as various types such as an application processor (AP), a central processing unit (CPU), a graphics processing unit (GPU), etc., and may be any semiconductor device that executes a command stored in the memory 720 or the storage device 750. The processor 710 may execute a program command stored in at least one of the memory 720 and the storage device 750. The processor 710 loads program instructions for implementing at least some functions of the data obtainer 610, the position calculator 620, and the outputter 630 described based on FIG. 6 to the memory 720, and may perform the operation described with reference to FIGS. 3 to 5.

The memory 720 and the storage device 750 may include various types of volatile or non-volatile storage media. For example, the memory 720 may include a read-only memory (ROM) 721 and a random access memory (RAM) 722. The memory 720 may be located inside or outside the processor 710, and may be connected to the processor 710 through various known means.

The input interface device 730 is configured to provide data to the processor 710.

The output interface device 740 is configured to output data from the processor 710.

At least some of the method for calculating a position of a dart pin according to an embodiment may be implemented as a program or software executed in a computing device, and the program or software may be stored in a computer-readable medium.

In addition, at least some of the method for calculating a position of a dart pin according to an embodiment may be implemented as hardware that can be electrically connected to the computing device.

According to an exemplary embodiment, it is possible to calculate the exact position of the dart pin and the dart tip. Therefore, it is possible to support an accurate dart game and dart score calculation.

The components described in the example embodiments may be implemented by hardware components including, for example, at least one digital signal processor (DSP), a processor, a controller, an application-specific integrated circuit (ASIC), a programmable logic element such as an FPGA, other electronic devices, or combinations thereof. At least some of the functions or the processes described in the example embodiments may be implemented by software, and the software may be recorded on a recording medium. The components, functions, and processes described in the example embodiments may be implemented by a combination of hardware and software. The method according to embodiments may be embodied as a program that is executable by a computer, and may be implemented as various recording media such as a magnetic storage medium, an optical reading medium, and a digital storage medium. Various techniques described herein may be implemented through digital electronic circuitry, or as computer hardware, firmware, software, or combinations thereof. The techniques may be implemented as a computer program product, i.e., a computer program tangibly embodied in an information carrier, e.g., in a machine-readable storage device (for example, a computer-readable medium) or in a propagated signal for processing, or to control an operation of a data processing apparatus, e.g., by a programmable processor, a computer, or multiple computers. A computer program(s) may be written in any form of programming language, including compiled or interpreted languages, and may be deployed in any form including a stand-alone program or a module, a component, a subroutine, or other units suitable for use in a computing environment. A computer program may be deployed to be executed on one computer or on multiple computers at one site or distributed across multiple sites and interconnected by a communication network. Processors suitable for execution of a computer program include, by way of example, both general and special purpose microprocessors, and any one or more processors of any kind of digital computer. Generally, a processor will receive instructions and data from a read-only memory or a random access memory or both. Elements of a computer may include at least one processor to execute instructions and one or more memory devices to store instructions and data. Generally, a computer will also include or be coupled to receive data from, transfer data to, or perform both on one or more mass storage devices to store data, e.g., magnetic or magneto-optical disks, or optical disks. Examples of information carriers suitable for embodying computer program instructions and data include semiconductor memory devices, for example, magnetic media such as a hard disk, a floppy disk, and a magnetic tape, optical media such as a compact disk read only memory (CD-ROM), a digital video disk (DVD), etc., and magneto-optical media such as a floptical disk and a read only memory (ROM), a random access memory (RAM), a flash memory, an erasable programmable ROM (EPROM), and an electrically erasable programmable ROM (EEPROM), and any other known computer readable media. A processor and a memory may be supplemented by, or integrated into, a special purpose logic circuit. The processor may run an operating system (08) and one or more software applications that run on the OS. The processor device also may access, store, manipulate, process, and create data in response to execution of the software. For the purpose of simplicity, the description of a processor device is used as singular; however, one skilled in the art will appreciate that a processor device may include multiple processing elements and/or multiple types of processing elements. For example, a processor device may include multiple processors or a processor and a controller. In addition, different processing configurations are possible, such as parallel processors. Also, non-transitory computer-readable media may be any available media that may be accessed by a computer, and may include both computer storage media and transmission media. The present specification includes details of a number of specific implements, but it should be understood that the details do not limit any invention or what is claimable in the specification but rather describe features of the specific example embodiment. Features described in the specification in the context of individual example embodiments may be implemented as a combination in a single example embodiment. In contrast, various features described in the specification in the context of a single example embodiment may be implemented in multiple example embodiments individually or in an appropriate sub-combination. Furthermore, the features may operate in a specific combination and may be initially described as claimed in the combination, but one or more features may be excluded from the claimed combination in some cases, and the claimed combination may be changed into a sub-combination or a modification of a sub-combination. Similarly, even though operations are described in a specific order in the drawings, it should not be understood as the operations needing to be performed in the specific order or in sequence to obtain desired results or as all the operations needing to be performed. In a specific case, multitasking and parallel processing may be advantageous. In addition, it should not be understood as requiring a separation of various apparatus components in the above-described example embodiments in all example embodiments, and it should be understood that the above-described program components and apparatuses may be incorporated into a single software product or may be packaged in multiple software products. It should be understood that the embodiments disclosed herein are merely illustrative and are not intended to limit the scope of the invention. It will be apparent to one of ordinary skill in the art that various modifications of the embodiments may be made without departing from the spirit and scope of the claims and their equivalents.

What is claimed is:

1. A method for calculating a position of a dart pin attached to a dart board divided into a plurality of segments, the method comprising:
    obtaining a plurality of optical data from a plurality of optical devices corresponding to at least one of a plurality of holes formed in each segment and installed on the rear surface of the dart board; and
    calculating a position of a dart pin attached to the dart board using the plurality of optical data,
    wherein the dart board is fixed to a backboard, and the plurality of optical devices are installed to face the rear surface of the dart board in a space between a rear surface of the dart board and the backboard.

2. The method of claim 1, wherein the optical data includes image data or optical data.

3. The method of claim 2, wherein the calculating of a position of a dart pin includes:
    checking whether there is an image change between two images by comparing each of a plurality of images obtained from a plurality of cameras with the previous image obtained from a plurality of cameras, respectively;
    when the brightness of an area where the image change occurs is darkened, determining that the dart pin is attached and calculating the position of the area; and
    outputting a score corresponding to the position of the area.

4. The method of claim 3, wherein the calculating of a position of a dart pin further includes determining that the dart pin is detached when the brightness of the area where the image change occurs becomes brighter.

5. The method of claim 3, wherein a light emitting device is attached to the end of the dart pin, and
    the calculating of a position of a dart pin further includes determining that the dart pin is attached when the brightness of the area where the image change occurs becomes brighter.

6. The method of claim 3, wherein the calculating of the position of the area includes calculating a position set corresponding to a camera that has photographed an image including the area as the position of the area.

7. The method of claim 2, wherein the calculating of a position of a dart pin includes:
    checking whether there is a brightness change by comparing each optical signal obtained from each optical sensor corresponding to each hole with the previous optical signal obtained from each optical sensor;
    if the brightness is changed from bright to dark, determining that the dart pin is attached and calculating a position of the hole changed from bright to dark; and
    outputting a score corresponding to the position of the hole.

8. The method of claim 7, wherein the calculating of a position of a dart pin further includes determining that the dart pin is detached when the brightness is changed from dark to bright.

9. The method of claim 7, wherein a light emitting device is attached to the end of the dart pin, and
    the calculating of a position of a dart pin further includes determining that the dart pin is attached when the brightness is changed from dark to bright.

10. An apparatus calculating a position of a dart pin attached to a dart board divided into a plurality of segments, the apparatus comprising:
    a plurality of optical devices that correspond to at least one of a plurality of holes formed in each segment and installed to face the rear surface of the dart board, and generate a plurality of optical data; and
    a position calculator that calculates a position of the dart pin attached to the dart board using the plurality of optical data, wherein the dart board is fixed to a backboard, and the plurality of optical devices are installed to face the rear surface of the dart board in a space between a rear surface of the dart board and the backboard.

11. The apparatus of claim 10, wherein the optical device includes a camera.

12. The apparatus of claim 11, wherein the position calculator that compares each image obtained from the plurality of optical devices with a previous image obtained from the plurality of optical devices, detects the area to which the dart pin is attached from the change in brightness between the two images, and calculates the position of the area.

13. The apparatus of claim 12, wherein the position calculator determines that the dart pin is attached when the brightness between the two images is changed from bright to dark.

14. The apparatus of claim 12, wherein a light emitting device is attached to the end of the dart pin, and
the position calculator determines that the dart pin is attached when the brightness between the two images is changed from dark to bright.

15. The apparatus of claim 10, wherein the optical device includes an optical sensor, and each optical sensor is installed in a one-to-one correspondence with each hole.

16. The apparatus of claim 15, wherein the position calculator compares each optical signal detected from the plurality of optical devices with the previous optical signal detected from the plurality of optical devices, detects the area to which the dart pin is attached from the change in brightness between the two optical signals, and calculates the position of the area.

17. The apparatus of claim 16, wherein the position calculator determines that the dart pin is attached when the brightness of the two optical signals is changed from bright to dark.

18. The apparatus of claim 16, a light emitting device is attached to the end of the dart pin, and
the position calculator determines that the dart pin is attached when the brightness of the two optical signals is changed from dark to bright.

* * * * *